UNITED STATES PATENT OFFICE 2,274,716

CARBOXYLIC ACID AMIDE DERIVATIVES AND METHOD OF MAKING

Chauncey Allan Lyford, Elma, N. Y., assignor to Allied Chemical & Dye Corporation, a corporation of New York No Drawing. Application May 20, 1939, Serial No. 274,835

17 Claims. (Cl. 260—513)

The present invention relates to new chemical compounds and to their manufacture. In particular the invention is directed to mono arylamides of poly-carboxylic acids wherein the carboxyl groups are mutually joined by a carbon to carbon linkage, i. e., a single bond or a hydrocarbon residue, and wherein a primary amino group and a sulfonamide group are present as nuclear substituents in the arylamine residue.

The products of the present invention are valuable as intermediates for the preparation of azo dyes, especially those prepared by diazotizing the said products and coupling in acid solution with beta-naphthylamine sulfonic acids or derivatives thereof. The dyestuffs so formed dye wool in level shades of excellent fastness to light. As a result of the presence of a free carboxylic acid group in the acyl residue of the products of the present invention, the said products are more soluble in water, for instance, in the form of their alkali-metal salts, and are consequently more easily diazotized than the mono-N-acyl-arylenediamine sulfonamides heretofore produced. For this reason the present products possess a definite advantage over formerly known compounds of a similar nature.

The invention is concerned primarily with the dicarboxylic acid mono-anilides represented by the following general formula:

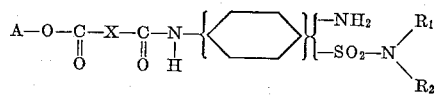

wherein A represents hydrogen or a water-soluble-salt-forming metal or group such as sodium, potassium, ammonium, etc.; X represents a carbon to carbon linkage, i. e., a single bond, or a hydrocarbon residue, substituted or unsubstituted, especially the residue of a dicarboxylic acid which is capable of forming an inner anhydride; $R_1$ and $R_2$, which may be similar or dissimilar, represent hydrogen or substituted or unsubstituted alkyl, aralkyl, aryl, or cyclo-alkyl radicals. If $R_1$ or $R_2$ is a substituted alkyl or cyclo-alkyl radical, it may contain as substituents such groups as OH, O—$SO_3H$, or $SO_3H$. If $R_1$ or $R_2$ is a substituted aryl radical, it may be substituted, for instance, by alkyl, hydroxyl, halogen, alkoxy, or nitro groups. The benzene ring of the formula may contain similar substituents.

Examples of suitable poly-carboxylic acids from which the residue, A—O—CO—X—CO—, may be derived are maleic acid, succinic acid, tartaric acid, secondary amino succinic acids, phthalic acids, naphthalic acids, oxalic acid, adipic acid, and methyl glutaric acid. Especially suitable acids are maleic and succinic acids.

The preferred products of the present invention are the dicarboxylic acid monoanilides which contain as nuclear substituents of the aniline residue, a primary amino group in the para position and a sulfonamide group in the meta position.

The products may be prepared by reacting, at normal or elevated temperature, as for instance by heating in aqueous or alcoholic solution, a poly-carboxylic acid or a suitable functional derivative thereof, i. e., an acid salt, ester, or anhydride, with an arylene diamine sulfonamide or a salt thereof, such as the hydrochloride or hydrogen sulfate; or with a nitro-arylamine sulfonamide (with subsequent reduction of the nitro group); or with an amino azo compound derived by diazotization, coupling, and reduction from a nitro-arylamine sulfonamide (with subsequent reduction of the azo group). If esters of polycarboxylic acids are employed as the acylating agents, ester groups which remain in the acylated products may be converted into free acid groups by saponification in the usual manner.

The preferred process comprises the acylation of a paraphenylene diamine sulfonamide, or a salt thereof, by means of a dicarboxylic acid inner anhydride. The acylation may be effected satisfactorily at normal room temperatures and pressures in a suitable reaction medium such as water, alcohol, benzene, toluene, chloroform, or carbon tetrachloride. The reagents may be slurried together in one of the aforesaid media, or ground together in the form of a paste, or in some cases even in powdered form, in order to cause reaction to take place. It is preferred to employ an aqueous medium containing one part by weight of the diamine to each six to eight parts of water, and sufficient mineral acid such as hydrochloric acid or sulfuric acid to form a water-soluble acid salt of the diamine. From 1 to 1½ parts by weight of an organic solvent, such as benzene, may be added. Temperatures which are substantially higher than room temperatures may be employed for the condensation but are unnecessary; it is preferred to employ temperatures not exceeding 30° C. When conducted in the above manner, the reaction is substantially complete wtihin from one to five hours; the amino group in meta-position to the sulfonamide group is selectively acylated.

The acylated products may be transformed by further treatment into their derivatives. Thus the mono-maleamic acid of 1,4-diamino-benzene-2-sulfon-N-ethyl anilide may be converted to the corresponding 4-amino omega-methylamino succinanilic acid-sulfon-(N-ethyl-anilide) by reaction with methylamine. The latter reaction may be conducted by boiling under reflux, or heating in an autoclave at temperatures between 100° C. and 200° C. in the presence of an inert solvent; e. g., water, benzene, toluene, etc.

The following examples illustrate the process for preparing the products of this invention—

*Example 1 [4-amino-succinanilic-acid-3-sulfon-(N-ethyl-anilide)]*

0.1 gram mol of 1,4-diaminobenzene-2-sulfon-(N-ethyl-anilide) (mol. wt.=291), in the form of a moist filter cake weighing 33 grams, is placed in a wide-mouthed flask containing 200 grams of water. Sufficient hydrochloric acid (e. g. 9 cc. of 20° Bé. hydrochloric acid) is added to render the solution faintly acid to Congo red. 50 cc. of benzene are added and the mixture is agitated vigorously. 12 grams of finely ground succinic acid anhydyride (0.12 mol) are added gradually. Agitation is continued for one and one-half hours at room temperature, during which time a light violet-gray product separates. The product is filtered out, washed with water, and dried at a temperature between 50° C. and 60° C. The dried product is a light, soft powder of light violet-gray color, insoluble in cold water but readily soluble in dilute aqueous soda ash solutions. In the form of this sodium salt, the product has the following probable formula:

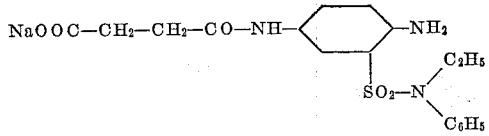

*Example 2*

15 grams (0.052 gram mol) of 1,4-diamino-benzene-2-sulfon-(N-ethyl-anilide) and 88 grams of benzene are mixed together and vigorously agitated in a 250 cc. flask. 5.5 grams (0.055 gram mol) of flaked succinic anhydride are added gradually over a period of twenty minutes. Gradual addition of the acid anhydride insures a smooth reaction. Agitation is continued for one hour after all of the succinic anhydride has been added. The resulting slurry is then filtered, and the filter cake is washed with 24 grams of benzene. The product obtained by drying the filter cake is a fine white powder, which has the same characteristics and apparently the same chemical structure as the products of the preceding example.

*Example 3 [4-amino-maleanilic acid-3-sulfon-(N-ethyl-anilide)]*

0.1 gram mol of 1,4-diamino-benzene-2-sulfon-(N-ethyl anilide) in the form of a moist filter cake weighing 33 grams, is dissolved in 200 cc. of water to which 5 cc. of 66° Bé. sulfuric acid have been added. 12 grams (0.12 mol) of crushed maleic acid anhydride crystals are added, and the mixture is agitated at room temperature for at least three hours. A yellow precipitate separates from the solution. The precipitate is filtered off, washed with water, and dried at a temperature between 50° C. and 60° C. The product is insoluble in cold water but dissolves in dilute aqueous soda ash solution. In the form of its sodium salt, the probable formula of the product is as follows:

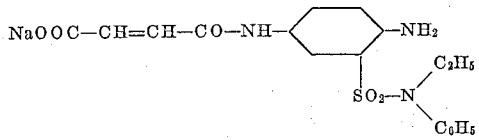

*Example 4 [4-amino-omega-methylamino-succinanilic acid-3-sulfon-(N-ethyl-anilide)]*

19.5 grams (0.05 mol) of the product of Example 3, 2.7 grams of soda ash and 15 cc. of 33 per cent aqueous methylamine solution are added to 20 grams of water and the mixture is heated to boiling under reflux for four hours. The resulting solution is evaporated on a steam bath until the odor of methylamine becomes weak. The residue is dissolved in about 200 cc. of cold water. 4 grams of decolorizing charcoal (Norite) are added and the mixture is boiled for one hour and then filtered. The filter cake is washed with a little warm water and the washings are added to the filtrate. By gradual addition of dilute hydrochloric acid to the filtrate, the product may be precipitated in the form of a light-colored, tarry material, which redissolves in excess hydrochloric acid, and is soluble in dilute aqueous ammonia or other alkaline solutions. In the form of its sodium salt, its probable formula is as follows:

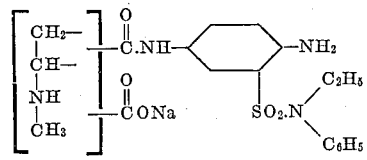

*Example 5 [4'-amino-ortho-phthalanilic-acid-3'-sulfon-(N-ethyl anilide)]*

15 grams (0.052 gram mol) of 1,4-diamino-benzene-2-sulfon-(N-ethyl anilide) and 5 cc. of chloroform are vigorously agitated with 100 grams water at room temperature. 8 grams (0.054 gram mol) of phthalic anhydride are added. Almost immediately a reaction occurs, and a suspension of a grayish gum is formed. The mixture is heated with continued agitation over a period of one hour to 90° C., and maintained at this temperature for about fifteen minutes, or until the odor of the chloroform is no longer noticeable. The suspension is then rendered slightly acid to Congo red by adding about 1 cc. of 20° Bé. hydrochloric acid, and chilled by addition of ice to 10° C. or less. The insoluble, coarse, brittle, suspended product is separated by filtration as the filter cake, and ground with water to a smooth paste or slurry. The latter is filtered and the filter cake is washed with water and dried. The resulting product is a yellowish gray crystalline powder, insoluble in water, but soluble in dilute aqueous soda ash solution. In the form of its sodium salt, the probable formula of the product is as follows:

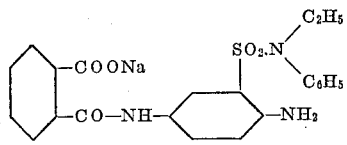

I claim:
1. As a new chemical compound a member of the group consisting of mono-arylamides of polycarboxylic acids of which the carboxyl groups are mutually joined by a carbon to carbon link- age, containing a primary amino group and a sulfonamide group as nuclear substituents of the arylamine residue, and water soluble salts thereof.

2. As a new chemical compound a member of the group consisting of mono-anilides of dicarboxylic acids of which the carboxyl groups are mutually joined by a carbon to carbon linkage, containing a primary amino group and a sulfonamide group as nuclear substituents of the aniline residue, and water-soluble salts thereof.

3. As a new chemical compound a mono-anilide of a dicarboxylic acid of which the carboxyl groups are mutually joined by a carbon to carbon linkage, containing as nuclear substituents of the aniline residue a primary amino group in the para position and a sulfonamide group in the meta position.

4. As a new chemical compound a mono-anilide of an inner-anhydride-forming dicarboxylic acid containing as nuclear substituents of the aniline residue, a primary amino group in the para position and a sulfonamide group in the meta position.

5. As a new chemical compound 4-amino-maleanilic acid-3-sulfon-(N-ethyl anilide) salts thereof.

6. As a new chemical compound 4-amino-succinanilic acid-3-sulfon-(N-ethyl anilide).

7. As a new chemical compound 4-amino-omega-methylamino-succinanilic acid-3-sulfon-(N-ethyl anilide).

8. The method of preparing a compound of claim 1 which comprises reacting a member selected from the group consisting of poly-carboxylic acids wherein the carboxyl groups are mutually joined by a carbon to carbon linkage, their water-soluble acid salts, esters, and anhydrides, with a member of the group consisting of arylene diamines and salts thereof, containing a sulfonamide group as a substituent in the arylene ring.

9. The method of preparing a compound of claim 2 which comprises reacting a member selected from the group consisting of di-carboxylic acids wherein the carboxyl groups are mutually joined by a carbon to carbon linkage, their water-soluble acid salts, esters, and anhydrides, with a member of the group consisting of phenylene diamines and salts thereof, containing a sulfonamide group as a substituent in the phenylene ring.

10. The method of preparing a compound of claim 3, which comprises condensing a member of the group consisting of dicarboxylic acids wherein the carboxyl groups are mutually joined by a carbon to carbon linkage, their water-soluble acid salts, esters, and anhydrides, with a member of the group consisting of paraphenylene diamines and salts thereof, containing a sulfonamide group as a substituent in the phenylene ring.

11. The method of preparing a compound of claim 4, which comprises condensing an inner anhydride of a dicarboxylic acid with a member of the group consisting of paraphenylene diamine and salts thereof, containing a sulfonamide group as a substituent in the phenylene ring.

12. The method of preparing a compound of claim 4, which comprises condensing an inner anhydride of a dicarboxylic acid with a water-soluble mineral acid salt of a paraphenylene diamine, containing a sulfonamide group as a substituent in the phenylene ring, in an aqueous medium.

13. The method of preparing 4-amino-maleanilic acid - 3 - sulfon-(N-ethyl-analide), which comprises reacting a member of the group consisting of maleic acid, its water-soluble acid salts, esters, and anhydride, with a member of the group consisting of 1,4-diamino-benzene-2-sulfon-(N-ethyl-anilide) and salts thereof.

14. The method of preparing 4-amino-succinanilic acid - 3 - sulfon-(N-ethyl-anilide), which comprises reacting a member of the group consisting of succinic acid, its water-soluble acid salts, esters, and anhydride, with a member of the group consisting of 1,4-diamino-benzene-2-sulfon-(N-ethyl-anilide) and salts thereof.

15. The method of preparing 4-amino-omega-methylamino - succinanilic acid - 3 - sulfon-(N-ethyl-anilide), which comprises reacting a member of the group consisting of maleic acid, its water-soluble acid salts, esters, and anhydride with a member of the group consisting of 1,4-diamino-benzene-2-sulfon-(N-ethyl-anilide) and salts thereof, and heating the reaction product with methylamine.

16. The method of preparing 4-amino-maleanilic acid - 3 - sulfon-(N-ethyl-anilide), which comprises condensing about 1.2 mols of maleic anhydride with one mol of 1,4-diamino-benzene-2-sulfon-(N-ethyl-anilide), in a quantity of water equal to about six to eight times the weight of the diamino benzene compound, and containing about 0.9 mol of sulfuric acid and a minor quantity of benzene.

17. The method of preparing 4-amino-succinanilic - acid - 3 - sulfon-(N-ethyl-anilide), which comprises condensing about 1.2 mols of succinic anhydride with one mol of 1,4-diamino-benzene-2-sulfon-(N-ethyl-anilide), in a quantity of water equal to about six to eight times the weight of the diamino benzene compound, and containing about 0.9 mol of hydrochloric acid and a minor quantity of benzene.

CHAUNCEY ALLAN LYFORD.

CERTIFICATE OF CORRECTION.

Patent No. 2,274,716.  March 3, 1942.

CHAUNCEY ALLAN LYFORD.

It is hereby certified that error appears in the printed specification of the above numbered patent requiring correction as follows: Page 1, second column, line 51, for "wtihin" read --within--; page 2, first column, line 34, for "this" read --its--; page 3, first column, lines 26 and 27, claim 5, strike out the words "salts thereof"; and that the said Letters Patent should be read with this correction therein that the same may conform to the record of the case in the Patent Office.

Signed and sealed this 28th day of April, A. D. 1942.

Henry Van Arsdale,
Acting Commissioner of Patents.

(Seal)